United States Patent [19]

Kaiserswerth et al.

[11] 3,885,084

[45] May 20, 1975

[54] STRUCTURE FOR SEALING A JOINT IN AN ELECTROMAGNETIC SCREENING ENCLOSURE

[75] Inventors: Hans-Peter Kaiserswerth, Regensburg; Klaus Kowalkowski, Munich; Siegfried H. Benedikter, Taufkirchen, all of Germany

[73] Assignee: Siemens Aktiengesellschaft, Berlin & Munich, Germany

[22] Filed: Oct. 11, 1973

[21] Appl. No.: 405,395

[30] Foreign Application Priority Data

Oct. 16, 1972 Germany............................ 2250639

[52] U.S. Cl........... 174/35 MS; 52/465; 174/35 GC

[51] Int. Cl............................................... H05k 9/00

[58] Field of Search.......... 174/35 MS; 52/459, 465, 52/467

[56] References Cited

UNITED STATES PATENTS 3,217,085 11/1965 Lindgren........................ 174/35 MS 3,340,587 9/1967 Beyer.......................... 174/35 MSU

*Primary Examiner*—Darrell L. Clay

*Attorney, Agent, or Firm*—Hill, Gross, Simpson, Van Santen, Steadman, Chiara & Simpson

[57] ABSTRACT

A structure for covering a gap in a joint, which is between a pair of wall members which are interconnected by threaded fasteners such as bolts, of an electromagnetic screening enclosure and for electrically interconnecting the pair of wall members characterized by a metal cover member. Preferably, the wall members each have a pair of oppositely facing flanges which are adjacent to the gap of the joint and the cover member may be either a resilient member having edge portions for engaging the edges of the adjacent flanges for forming electrical connections therebetween, may be rigid and the structure includes either resilient or mechanical members for holding or clamping the edge portion in electrical engagement with the flanges of the wall members, or may be a flat sheet attached to each of the flanges of the wall members by an electrically conductive adhesive.

7 Claims, 10 Drawing Figures

STRUCTURE FOR SEALING A JOINT IN AN ELECTROMAGNETIC SCREENING ENCLOSURE

BACKGROUND OF THE INVENTION

1. Field of the Invention

The present invention is directed to a structure for sealing a joint in a wall of an electromagnetic screening enclosure.

2. Prior Art

The effectiveness of an electromagnetic screening enclosure, which is assembled from screening elements which elements are prefabricated standard walls, floors and sealing components detachably joined together, is largely dependent upon the properties of the joints which act as discontinuities in the screening envelope. The influence of the joints upon the screen attenuation of the enclosure is dependent upon the contact resistance of the joint connections and is most marked at frequencies below 1 MHz.

German Offenlegungsshrift No. 20 09 119 describes the joining of screening elements of the abovementioned type by threaded fasteners and it is proposed that in order to improve the screen attenuation, the corrugated contract springs previously inserted between the members forming the joint should be replaced by a sheet metal component which is provided on both faces with a large number of sharp cutting edges projecting out of the general surface of the component. These sharp cutting edges dig into the surface of the adjacent screening elements forming the joint when the latter are joined together to insure contact therebetween.

SUMMARY OF THE INVENTION

The present invention is directed to means provided at a joint of an electromagnetic screening enclosure to obtain additional improvements in the screen attenuation. The invention comprises a structure for sealing a joint in an electromagnetic screening enclosure which joint comprises a pair of wall members each having a first flange extending the length of the member and terminating in a second flange extending at an angle thereto and having a free edge. The members are held together by threaded fasteners with the first flanges of the members being in facing relationship and the second flanges extending the length of the joint and being adjacent one side thereof and their free edges facing in opposite directions. The structure comprising means for covering a gap of the joint and for electrically interconnecting the wall members with the means including an electrically conductive cover member extending across the gap between the adjacent pairs of second flanges of the wall member. The cover member can be a resilient member having portions for engaging the free edges of the second flange, can be a rigid member which is either clamped onto the second flanges or fastened thereto, or can be a flat member held to each of the second flanges of the wall member by electrically conductive adhesive.

DESCRIPTION OF THE PREFERRED EMBODIMENT

Figure 1:
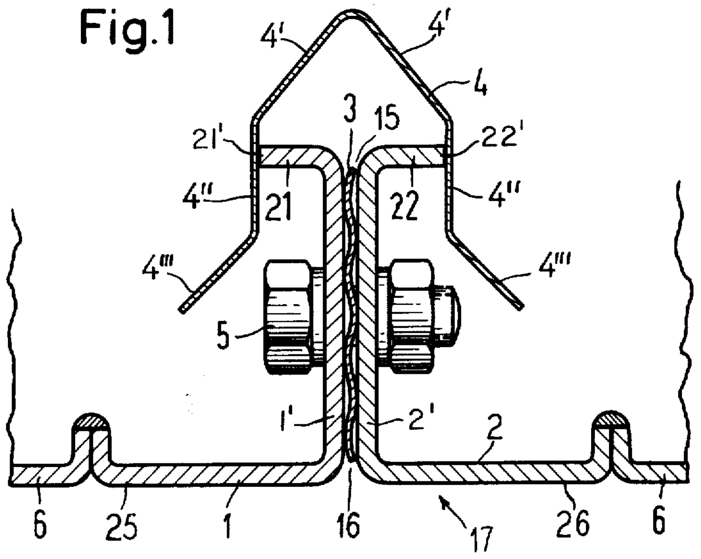
FIG. 1 is a partial cross section of a joint of a screening enclosure having an embodiment of the cover member of the present invention.

The principles of the present invention are particularly useful when incorporated in a structure for covering a gap 15 of a joint 16 for a screening enclosure generally indicated at 17 in FIG. 1. The joint 16 is between a pair of screening elements or wall members 1 and 2 which are detachably connected together by threaded fasteners such as bolts 5 to form the joint 16 having a gap 15 between portions or first flanges 1' and 2' of each of the two members which flanges 1' and 2' extend the length of the member at an angle thereto. A contact spring 3 is located in the gap 15 between the flanges 1' and 2' to produce an unbroken connection. However, it only becomes effective at frequencies above 1 MHz. As illustrated, each of the elements or members 1 and 2 have a U-shaped configuration with one leg 21 and 22, respectively, shortened or truncated for forming a short second flanges 21 and 22 which extend at an angle to the first flanges and have free edges 21' and 22', respectively. The opposite leg such as 25 and 26, respectively which extends at an angle to their respective first flanges 1' and 2', is formed with a flange and connected to adjacent screening plates or elements 6 such as by a solder joint. Thus, the enclosure 17, which is formed by the elements 6 along with the elements 1 and 2, provide a barrier to a high frequency radiation.

To seal the gap 15 of the joint 16, means including an electrically conductive cover member 4 of a resilient metal is provided. As illustrated, the cover member 4 has a helmut-shaped cross section which is formed by a pair of legs or portions 4' extending from an apex and terminating in parallel legs or spaced portions 4'' which in turn terminate in diverging legs or portions 4'''. The member 4 is slipped onto the adjacent second flanges 21 and 22 with the portions 4'' resiliently engaging the free edges of the adjacent second flanges 21 and 22 to electrically interconnect the two wall members 1 and 2 and to cover the gap 15.

Figure 2:
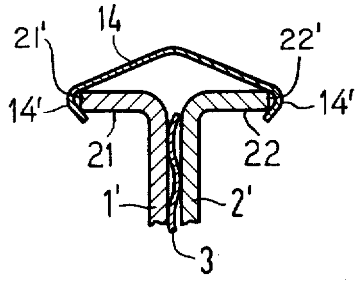
FIGS. 2–9 are partial cross sections of a joint provided with different embodiments of the cover member of the present invention.

An embodiment of the invention is illustrated in FIG. 2 and comprises a cover member 14 which has a ridged profile or cross section with a pair of interconnected legs extending in an open V and terminating in inwardly turned flanges or spaced edge portions 14'. The resilient nature of the cover member 14 causes the spaced portions 14' to engage the free edges 21' and 22' of the adjacent second flanges 21 and 22 to both electrically interconnect the members 1 and 2 and to cover the gap 15 of the joint 16.

Figure 3:
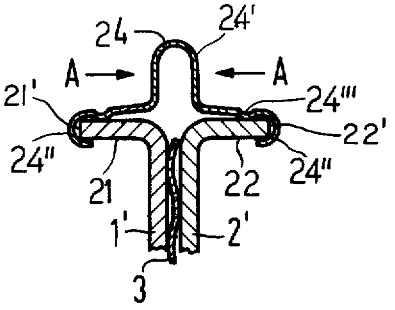

In FIG. 3, another embodiment of the structure utilizes a cover member 24 which has a convex cross section having a U-shaped portion 24' with outwardly extending legs terminating in flanges or curved edge portions 24''. As illustrated, the portions 24'' which are spaced portions wrap around the edges of the adjacent flanges 21 and 22 of the wall members 1 and 2 and are urged into engagement therewith in the direction indicated by arrows A by the resilient nature of the member 24. Adjacent to each of the edge portions 24'' is an indent 24''' which insures engagement of the portions 24'' with the respective second flanges 21 and 22 of the wall members 1 and 2.

Figure 4:
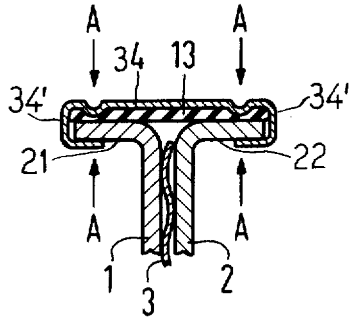

In FIG. 4, the structure of the present invention comprises a substantially flat cover member 34 which has a pair of edge portions or flanges 34'. As illustrated, disposed between the member 34 and the surfaces of the flanges 21 and 22 of the wall members 1 and 2 is a resilient member which may be a resilient pad of material 13 or a spring plate. The cover member 34 is assembled on the flanges 21 and 22 of the wall members 1 and 2 by having the edge portions such as 34' crimped or pressed by a tool applying a force in the direction of arrows A to wrap the portion 34' around the flanges of the wall members 1 and 2 and to cause compression of the resilient material such as the pad 13. Due to the resilient nature of the pad 13, the cover member 34 forms a good electrical connection between the flanges of the wall members 1 and 2.

Figure 5:
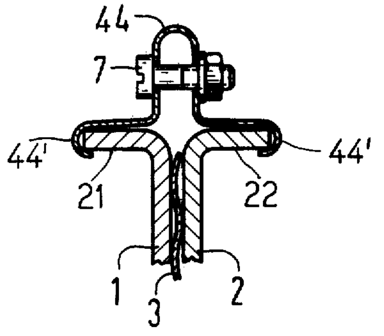

In another embodiment of the present invention, the structure includes a rigid cover member 44 (FIG. 5) having curved edge portions or flanges 44' which engage the edges of the flanges 21 and 22 of the wall member 1 and 2. To cause the electrical contact between the edge portions 44' and the flanges of the wall members 1 and 2, suitable threaded fasteners such as bolts or screws 7 are provided to draw or clamp the edge portions 44' into tight engagement with the flanges of the wall members 1 and 2.

Figure 6:
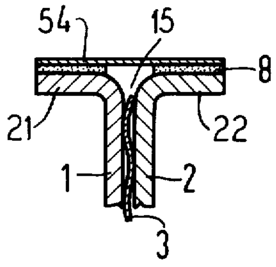

In FIG. 6, another embodiment of the structure utilizes a cover member 54 which is a substantially flat sheet or foil and is attached to the flanges 21 and 22 of the wall members 1 and 2 by an electrically conductive adhesive shown in a layer 8. The member 54 covers the gap 15 of the joint and also electrically interconnects the members 1 and 2.

Figure 7:
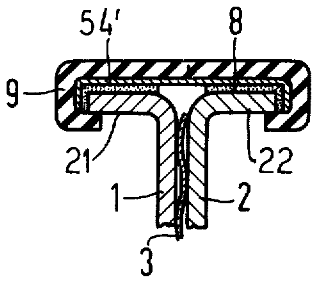

In the embodiment illustrated in FIG. 7, the structure includes a cover member 54' which is attached by an electrically conductive adhesive layer 8 and differs from the element 54 by the provision of edge flanges or portions. To protect the member or foil 54', a rubber member 9 having edge portions for wrapping around the adjacent flanges 21 and 22 of the wall members 1 and 2 is slipped over the cover member 54. This rubber member 9 provides protection for the cover member 54' and also provides an additional clamping of the cover member to the flanges 21 and 22.

Figure 8:
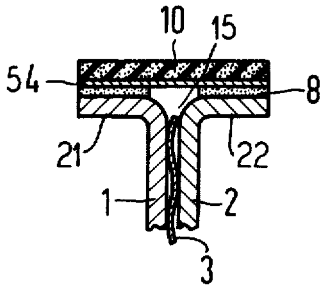

In the embodiment illustrated in FIG. 8, the means for forming the electrical connection and for covering the gap includes a permanent magnetic strip of rubber material 10 in addition to the cover member or foil 54. As in the embodiment of FIG. 6, the cover member 54 is held or bonded onto the flanges of the wall members 1 and 2 by the electrically conductive adhesive layers 8. The rubber material 10 which can be a rubber impregnated with magnetic particles protects the cover member 54 and provides additional holding force for holding the member in a position for covering the gap 15 between the two wall members 1 and 2.

Figure 9:
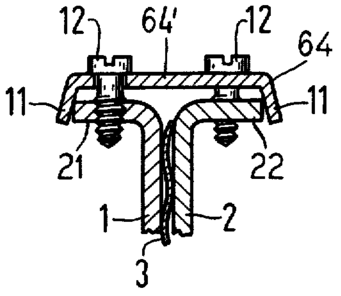

Another embodiment of the means for electrically connecting the wall members and for closing the gap is illustrated in FIG. 9 as a cover member 64. The cover member 64 is a rigid metal member having a channel shape or a U-shaped cross section with the edge portions or legs 11 obliquely extending from a base portion 64' and then being slightly diverging. To attach the member 64 onto the flanges of the wall members 1 and 2, fastening elements such as self-tapping screws 12 extend through the base portion 64' of the member 64 and are threaded into the flanges 21 and 22 of the wall members 1 and 2.

Figure 10:
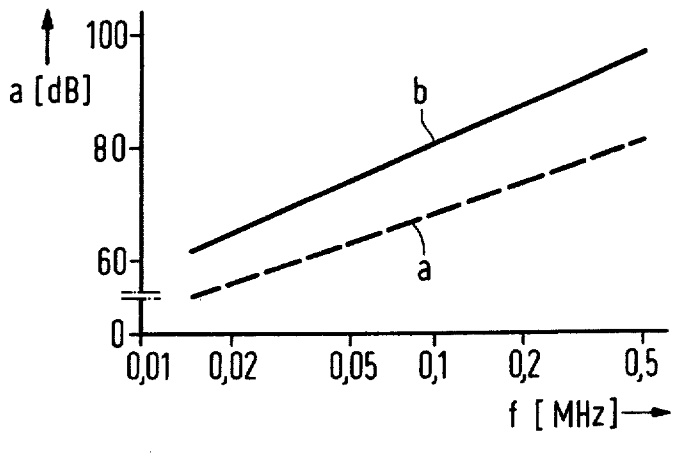
FIG. 10 is a graph showing the effect of the invention.

FIG. 10 is a graph illustrating the relationship of the screen attenuation *a* (decibels) in relation to the frequency *f* in MHz. A curve or line *a* relates to a contact joint without the means for electrically connecting and covering the gap while the curve *b* represents a joint provided with a cover member such as cover member 4 shown in FIG. 1. The improvement in the screen attenuation *a* is about 8 dB at 15 khz and at 500 khz is around 16 dB. In comparison with the relative simplicity of the mechanical structure of the invention, the improvement in screen properties is considerable.

Although various minor modifications might be suggested by those versed in the art, it should be understood that we wish to employ within the scope of the patent warranted herein all such modifications as reasonably and properly come within our contribution to the art.

We claim:

1. A structure sealing a joint in an electro-magnetic screening enclosure, the joint being between a pair of wall members with each member having a first flange extending the length of the member and at an angle to said member, each of said first flanges terminating in a second flange extending at an angle to said first flange and having a free edge, said members being held together by threaded fasteners with said first flanges of the members being in facing relationship and said second flanges being adjacent each other and on opposite sides of the residual gap of the joint with their free edges facing in opposite directions, said structure comprising an electrically conductive cover member of a resilient metal, said cover member having a pair of spaced portions and being detachably mounted on said wall members with the spaced portions of the cover member engaging the free edges of the adjacent second flanges, electrically interconnecting the wall members and covering the gap.

2. A structure according to claim 1, wherein the cover member has a helmut-shaped cross section with said spaced portions resiliently engaging edges of the adjacent second flanges.

3. A structure according to claim 1, wherein the cover member has a V-shaped cross section having a pair of legs interconnecting the spaced portions, said legs resiliently urging the spaced portions into engagement with the free edges of the adjacent second flanges of the wall members.

4. A structure according to claim 3, wherein said spaced portions are parallel portions and terminate in diverging portions.

5. A structure according to claim 3, wherein said portions are inwardly directed edge spaced portions.

6. A structure according to claim 1, wherein the pair of spaced portions are curved portions interconnected by a convex cross sectional portion.

7. A structure according to claim 1, wherein the cover member is made of a magnetically conductive material.

* * * * *